(12) United States Patent
Takahashi

(10) Patent No.: US 6,978,801 B2
(45) Date of Patent: Dec. 27, 2005

(54) BACKFLOW PREVENTION VALVE

(75) Inventor: Hideaki Takahashi, Yokohama (JP)

(73) Assignee: NIFCO Inc., Yokohama (JP)

( * ) Notice: Subject to any disclaimer, the term of this patent is extended or adjusted under 35 U.S.C. 154(b) by 115 days.

(21) Appl. No.: 10/419,143

(22) Filed: Apr. 21, 2003

(65) Prior Publication Data
US 2004/0000342 A1     Jan. 1, 2004

(30) Foreign Application Priority Data
Jun. 28, 2002 (JP) .............................. 2002-189099

(51) Int. Cl.$^7$ ............................................. F16K 15/02
(52) U.S. Cl. ................. 137/543.19; 137/538; 137/592; 251/357
(58) Field of Search .......................... 137/538, 543.19, 137/543.21, 587, 592, 540; 251/357

(56) References Cited

U.S. PATENT DOCUMENTS

| | | | | |
|---|---|---|---|---|
| 1,707,017 A | * | 3/1929 | Kibele ........................ | 251/357 |
| 1,800,185 A | * | 4/1931 | Thrush ........................ | 251/357 |
| 1,916,766 A | * | 7/1933 | Lytel .......................... | 137/538 |
| 2,185,103 A | * | 12/1939 | Heigis ......................... | 137/540 |
| 2,797,704 A | * | 7/1957 | McDermott et al. ..... | 137/543.19 |
| 2,800,142 A | * | 7/1957 | Champion ............... | 137/543.19 |
| 2,935,082 A | * | 5/1960 | Richardson et al. ..... | 137/543.19 |
| 3,036,594 A | * | 5/1962 | Salisbury ................ | 137/543.19 |
| 3,358,770 A | * | 12/1967 | Myron .................... | 137/543.19 |
| 3,511,475 A | * | 5/1970 | Pfau ......................... | 251/357 |
| 4,815,493 A | * | 3/1989 | Miller et al. ........... | 137/543.19 |
| 5,546,981 A | * | 8/1996 | Li et al. ................. | 137/543.19 |
| 5,568,828 A | * | 10/1996 | Harris .................... | 137/587 |
| 5,794,657 A | * | 8/1998 | Oberg .................... | 137/543.19 |
| 6,012,599 A | * | 1/2000 | Miura et al. ........... | 137/592 |
| 6,340,031 B1 | * | 1/2002 | Matsumoto et al. ... | 137/592 |
| 6,648,016 B2 | * | 11/2003 | Farrenkopf et al. ... | 137/538 |

* cited by examiner

Primary Examiner—John Rivell
(74) Attorney, Agent, or Firm—Manabu Kanesaka

(57) ABSTRACT

A backflow prevention valve includes a cylindrical case member with an inflow opening at one end and an outlet at the other end or a peripheral surface or both, and a valve member contacting a peripheral edge of the inflow opening for closing the inflow opening. An urging device urges the valve member toward the inflow opening, and a liquid inflow pipe is connected to the inflow opening from outside the case member. The liquid inflow pipe has a smooth inner surface without unevenness, and is attached to a fuel supply pipe inside the fuel tank. When the fuel is supplied, the valve member moves against an urging force of the urging device due to a fuel pressure, so that the inflow opening opens.

5 Claims, 8 Drawing Sheets

Fig. 3(A)
Fig. 3(B)
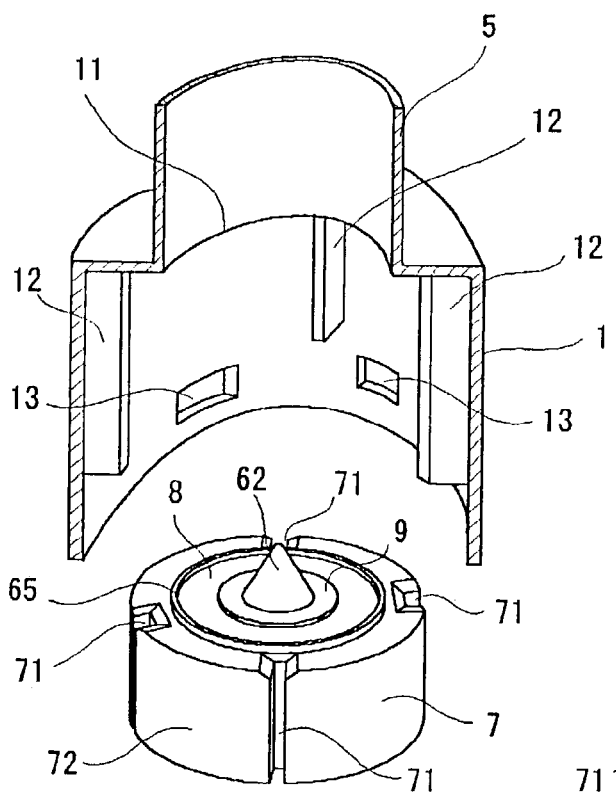
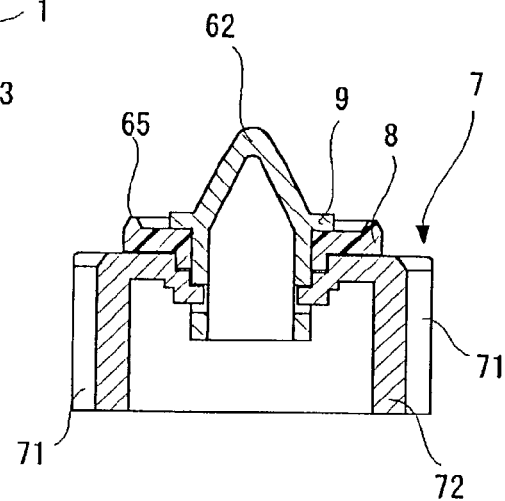
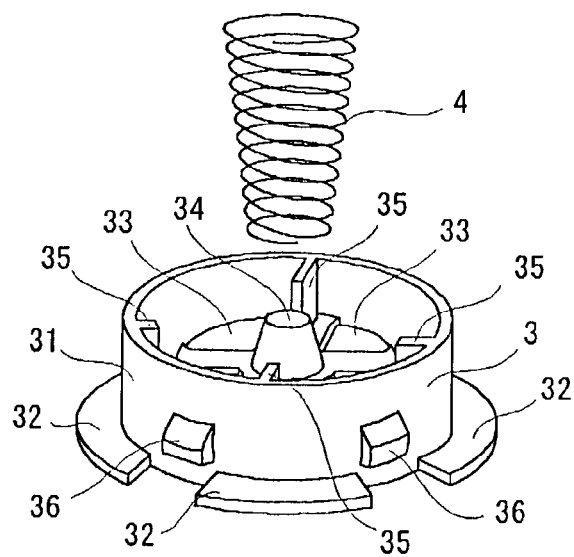

Fig. 5(A)
Fig. 5(B)
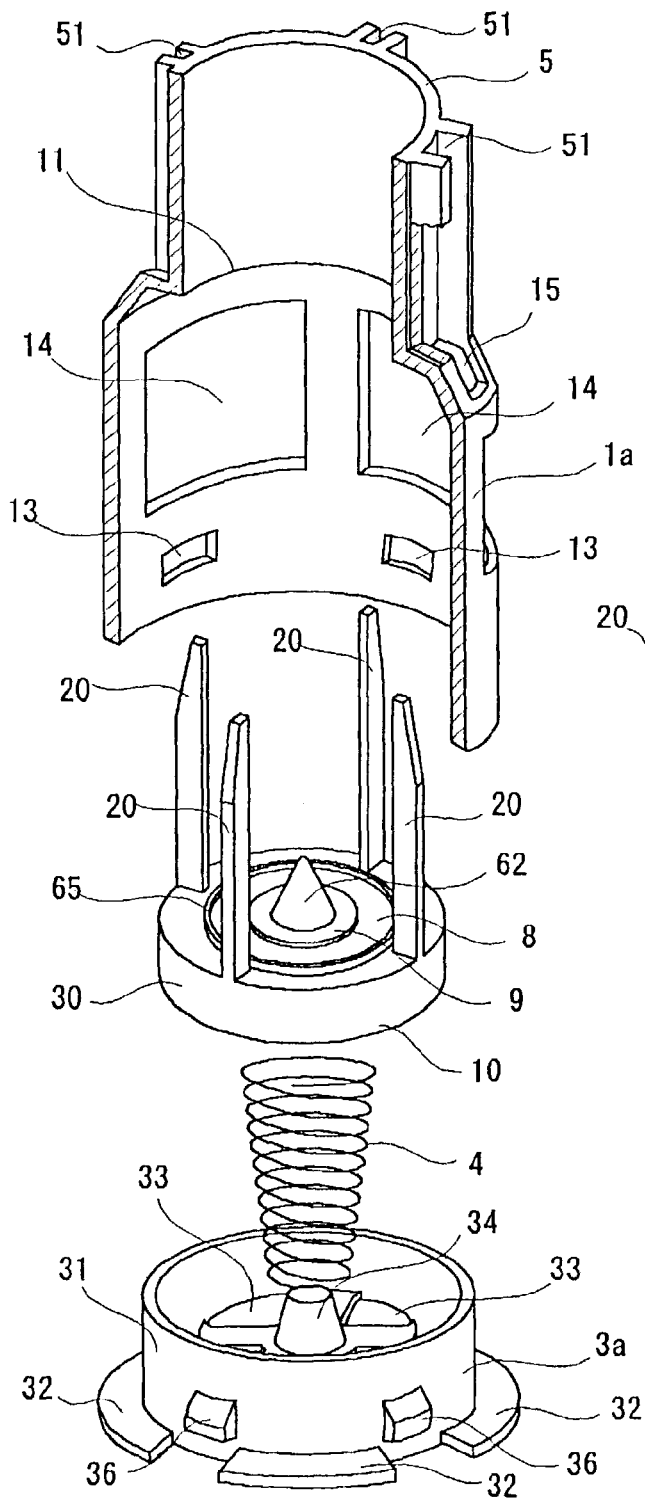
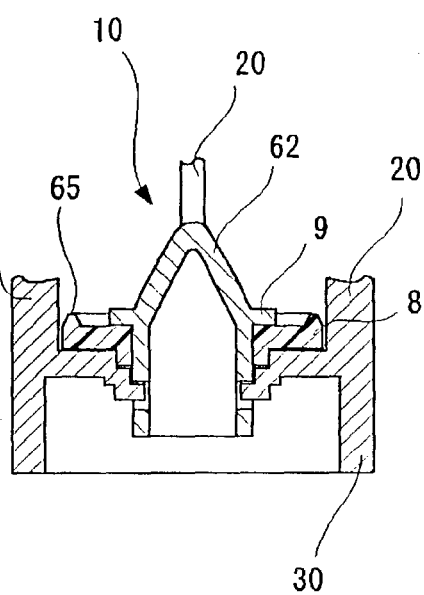

BACKFLOW PREVENTION VALVE

BACKGROUND OF THE INVENTION AND RELATED ART STATEMENT

The present invention relates to a backflow prevention valve attached to a tip of a fuel supply pipe for supplying fuel to a fuel tank of an automobile. The backflow prevention valve is usually closed to prevent backflow of the fuel, so that when the automobile turns over or falls down, the fuel does not leak from the supply pipe. When the fuel is supplied to the fuel tank, a fuel liquid pressure opens the backflow prevention valve for the fueling.

As shown in FIG. 7, a backflow prevention valve v is attached to a tip of a supply pipe p for supplying fuel into a fuel tank t of an automobile in order to prevent the fuel from leaking through the supply pipe p when the automobile turns over or falls down.

As shown in FIGS. 8(A) and 8(B), a conventional backflow prevention valve has been disclosed in Japanese Patent Publication (Tokkai) No. 11-78549. As shown in FIGS. 8(A) and 8(B), the backflow prevention valve is formed of a cylindrical case member a and a covering member b for closing a lower end of the case member. An inflow opening c is formed at an upper end of the case member, and a liquid inflow pipe d with a smaller diameter is connected to the inflow opening c. A valve member e is disposed inside the case member a to be movable for opening and closing the inflow opening c from inside.

The valve member e is formed of a cylindrical body, and has four guiding arms f formed on an upper peripheral surface of the cylindrical body at locations shifted by 90 degrees with each other. A conical projection g is projected at a center of a top surface of the valve member e for regulating the fuel flow, and a ring-shaped sealing portion h is provided at a lower peripheral edge.

The valve member e is disposed inside the case member a in a state that each guiding arm f is inserted in the liquid inflow pipe d, and is urged upward (toward the liquid inflow pipe d) by a coil spring i. Four guiding grooves j formed between a pair of projecting strips along an axial direction are provided on an inner surface of the liquid inflow pipe d at locations shifted by 90 degrees with each other. Each guiding arm f is fitted to slide inside each guiding groove j. The valve member e is supported and guided by the guiding arms f sliding inside the guiding groove j.

The backflow prevention valve is disposed in the fuel tank t, like the valve v shown in FIG. 7, when the liquid inflow pipe d is attached to an end of the supply pipe p of the fuel tank t. As shown in FIG. 8(A), the sealing portion h of the valve member e usually contacts the peripheral edge of the inflow opening c of the case member a from inside by an urging force of the coil spring i. Accordingly, the valve member e closes the inflow opening c, so that the fuel inside the fuel tank does not leak through the supply pipe p.

When the fuel is supplied, as shown in FIG. 8(B), the valve member e moves downward (toward the covering member b) against the urging force of the coil spring i by a pressure of the fuel supplied into the fuel tank through the liquid inflow pipe d from the supply pipe. Therefore, the inflow opening c of the case member a opens, so that the fuel flows into the case member a through the inflow opening c from the liquid inflow pipe d. Then, the fuel is supplied into the fuel tank from an outlet (not shown) provided on the peripheral wall of the case member a.

However, in the conventional backflow prevention valve, the valve member e does not move smoothly when the fuel is supplied.

In other words, in the conventional backflow prevention valve, the guiding grooves j for guiding the valve member e are provided inside the liquid inflow pipe d, and eight projecting strips forming the guiding grooves j are projected on the inner surface of the liquid inflow pipe d. Consequently, when the fuel is supplied, the fuel flow causes turbulence inside the liquid inflow pipe d, so that the valve member e does not move smoothly due to the turbulence when a large amount of fuel is supplied at a high speed. Also, due to the turbulence, the valve member e can be twisted or tilted, resulting in an unstable movement of the valve member e for closing the valve after the fueling.

The present invention is proposed in order to solve the above problems, and an object of the present invention is to provide a highly reliable backflow prevention valve. The backflow prevention valve is usually closed to prevent the fuel backflow, and also can be opened and closed reliably and stably during and after the fueling.

Further objects and advantages of the invention will be apparent from the following description of the invention.

SUMMARY OF INVENTION

In order to achieve the above-mentioned objectives, the present invention provides a backflow prevention valve attached to an end of a supply pipe inside a fuel tank for supplying fuel to the fuel tank. The backflow prevention valve includes a cylindrical case member with an inflow opening at one end and an outlet at the other end or a peripheral surface or both, and a sealing portion contacting a peripheral edge of the inflow opening from inside the case member for closing the inflow opening. The case member includes a valve member movable in an axial direction; an urging device for urging the valve member toward the inflow opening; and a liquid inflow pipe connected to the inflow opening from outside the case member. Further, the liquid inflow pipe has a smooth inner surface without unevenness. The liquid inflow pipe is attached to the end of the supply pipe inside the fuel tank. A sealing portion of the valve member usually contacts the peripheral edge of the inflow opening from inside the case member due to an urging force of the urging device to close the inflow opening. When the fuel is supplied, the valve member of the backflow prevention valve moves against the urging force of the urging device due to a fuel pressure flowing into the tank through the supply pipe, so that the inflow opening opens.

In other words, in the backflow prevention valve of the present invention, a supporting guide device is provided for supporting and guiding the valve member to be movable for opening and closing movements. The supporting guide device is provided between an inner peripheral surface of the case member and an outer peripheral surface of the valve member. The supporting guide device may be formed of a guide arm provided in the valve member and inserted in a guide groove provided on the peripheral surface of the liquid inflow pipe. Therefore, the liquid inflow pipe has a smooth inner peripheral surface without unevenness.

With this configuration, even when the fuel is supplied through the liquid inflow pipe from the supply pipe in a large amount at a high speed, the fuel flows smoothly inside the liquid inflow pipe without generating turbulence. Thus, the valve member can open and close smoothly during and after the fueling, thereby ensuring the valve member to open and close smoothly.

According to the backflow prevention valve of the present invention, the valve is usually closed reliably, so that the fuel does not flow backward. Further, during and after the fueling, the opening and closing movement is performed reliably and stably.

BRIEF DESCRIPTION OF THE DRAWINGS

FIGS. 2(A), 2(B) are partial sectional views showing the backflow prevention valve, wherein FIG. 2(A) shows a state that the valve is closed, and FIG. 2(B) shows a state that the valve is open;

FIG. 3(A) is an exploded sectional perspective view showing a backflow prevention valve according to the second embodiment of the present invention, and FIG. 3(B) is a partial sectional view showing a valve member of the backflow prevention valve;

FIGS. 4(A), 4(B) are sectional views showing the backflow prevention valve of the second embodiment, wherein FIG. 4(A) shows a state that the valve is closed, and FIG. 4(B) shows a state that the valve is open;

FIG. 5(A) is an exploded sectional perspective view showing a backflow prevention valve according to the third embodiment of the present invention, and FIG. 5(B) is a partial sectional view showing a valve member of the backflow prevention valve;

FIGS. 6(A), 6(B) are sectional views showing the backflow prevention valve of the third embodiment, wherein FIG. 6(A) shows a state that the valve is closed, and FIG. 6(B) shows a state that the valve is open;

FIGS. 8(A), 8(B) are sectional views showing a conventional backflow prevention valve, wherein FIG. 8(A) shows a state that the valve is closed, and FIG. 8(B) shows a state that the valve is open.

DETAILED DESCRIPTION OF PREFERRED EMBODIMENTS

Hereunder, the present invention is explained more specifically with reference to the embodiments of the present invention.

Figure 1:
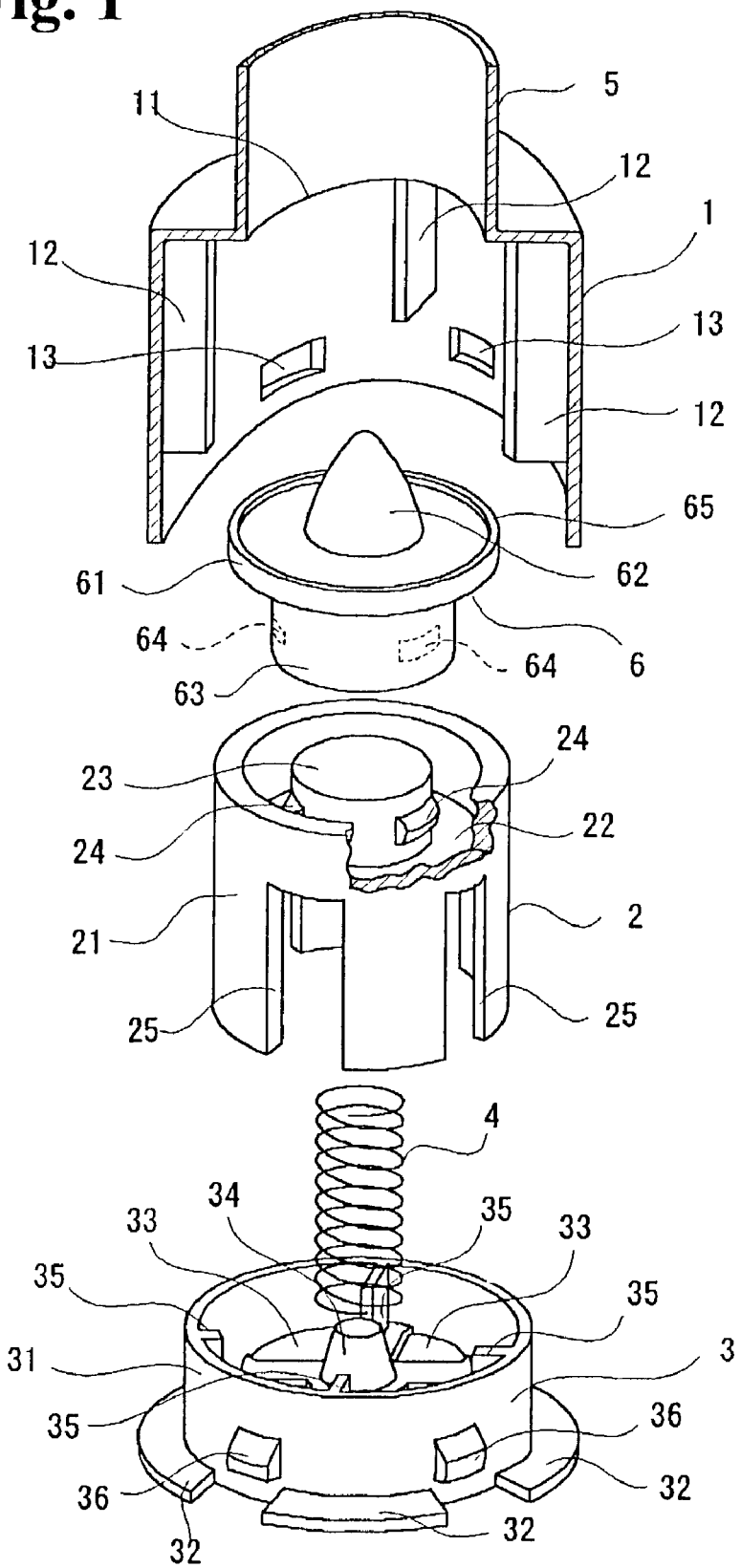
FIG. 1 is an exploded sectional perspective view showing a backflow prevention valve according to the first embodiment of the present invention.
Figure 2A:
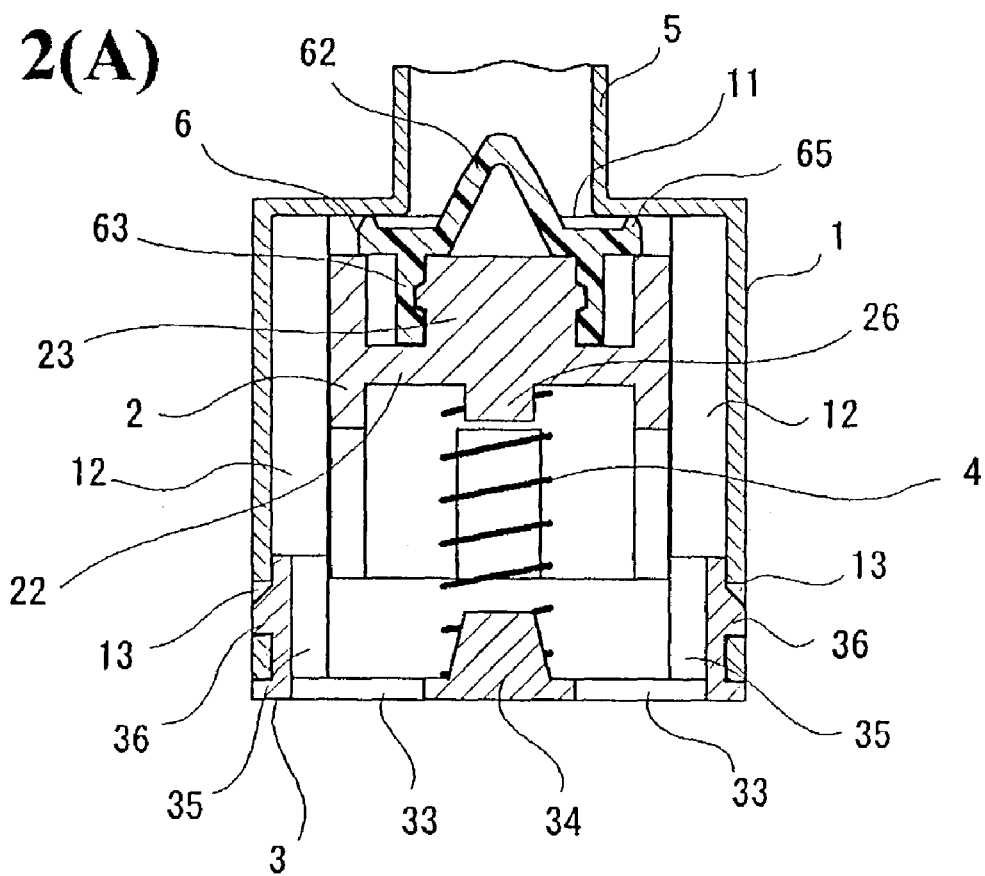
Figure 2B:
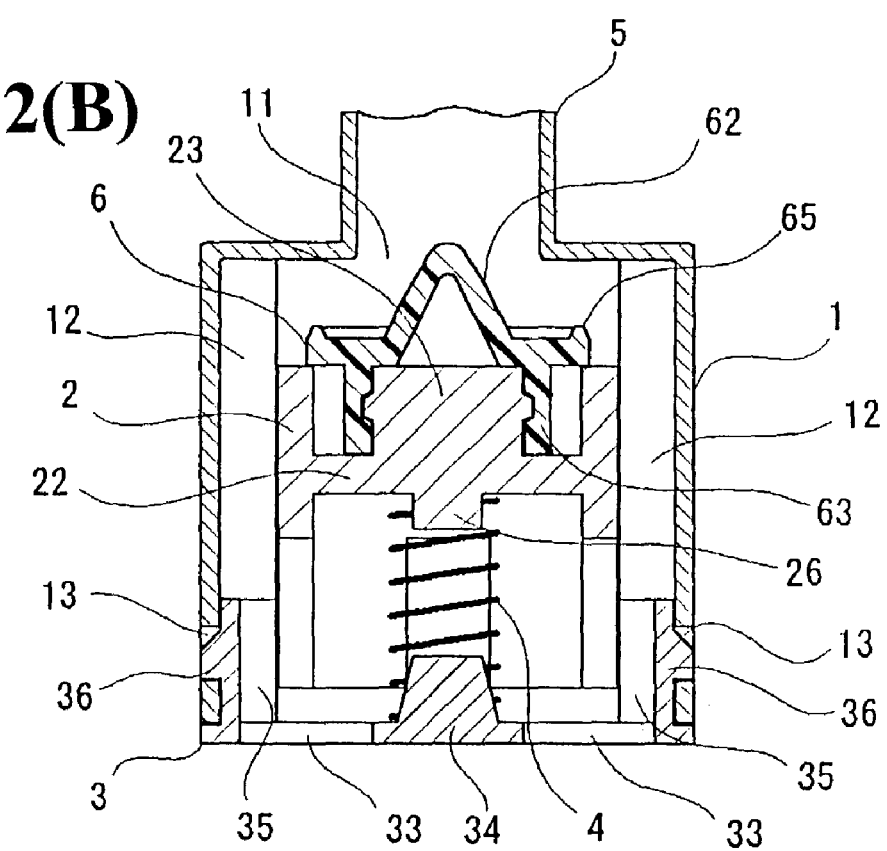

FIGS. 1 and 2(A), 2(B) show a backflow prevention valve according to the first embodiment of the present invention. As shown in FIG. 1, the backflow prevention valve includes a cylindrical case member 1; a valve member 2 disposed inside the case main member 1 to be movable along an axial direction; a coil spring (urging device) 4 for urging the valve member 2; and a covering member 3 for closing a lower end of the case member 1.

A ring-shape wall plate is provided at an upper end of the case member 1, and a circular inflow opening 11 is provided at a center of the wall plate. A liquid inflow pipe 5 with a smaller diameter than that of the case member 1 is integrally connected to the inflow opening 11 from outside. Four ribs 12 (only three are shown in FIG. 1) are projected on an inner peripheral surface of the case member 1 along the axial direction at positions shifted by 90 degrees with each other. Furthermore, four engagement holes 13 (only two are shown in FIG. 1) are formed at a lower end of the peripheral wall with an even interval.

As shown in FIG. 1, the covering member 3 attached to the lower end of the case member 1 is formed of a cylindrical main member 31 with a bottom and four arc-shaped flanges 32 protruded at a lower end peripheral edge of the cylindrical main member 31. Also, four fan-shaped outlets 33 are formed on a bottom of the covering member with an even interval, and a cone-shaped spring retainer projection 34 is protruded at a center of an inner bottom surface. The main member 31 is provided with four ribs 35 protruded on the inner peripheral surface thereof, and also provided with engagement projections 36 protruded on the outer peripheral surface thereof for engaging engagement holes 13 provided on the case member 1.

As shown in FIG. 2, the main member 31 is inserted into the lower end of the case member 1 to engage the engagement projections 36 of the covering member 3 with the engagement holes 13 of the case member 1, thereby fixing the covering member 3 to the lower end of the case member 1.

As shown in FIG. 1, the valve member 2 is formed of a cylindrical main member 21, and a partition wall 22 is formed inside slightly above the middle of the cylindrical main member 21. A sealing member fitting portion 23 having a cylindrical shape with a short length is integrally provided at a center of an upper surface of the partition wall 22. Four engagement projections 24 are protruded on a peripheral surface of the sealing member fitting portion 23, and four notched window portions 25 are formed on a lower peripheral wall of the main body below the partition wall 22. Also, as shown in FIGS. 2(A), 2(B), a projection 26 is protruded at a center of a lower surface of the partition wall 22 for fixing an upper end of the coil spring 4.

A sealing member 6 formed of an elastic material such as a rubber is fixed to an upper end of the valve member 2. As shown in FIG. 1, the sealing member 6 is formed of a circular main member 61. A conical commutating member 62 is integrally projected at a center of an upper surface of the circular main member 61, and a cylindrical foot portion 63 is integrally projected at a center of a lower surface of the circular main member 61. The foot portion 63 is put on the sealing member fitting portion 23 of the valve member 2, and engagement depressions 64 formed at an inner surface of the foot portion 63 engage the engagement projections 24 of the sealing member fitting portion 23, thereby fixing the sealing member 6 to the upper end of the valve member 2. Moreover, a circular projection wall 65 is protruded on an upper surface of the main member 61 to constitute a sealing portion (hereinafter referred to as the "sealing portion 65").

As shown in FIG. 2, the valve member 2 is housed inside the case member 1 to be movable along the axial direction in a state that the sealing member 6 faces the inflow opening 11. Also, the valve member 2 is urged toward the inflow opening 11 by the coil spring (urging device) 4 attached between the projection 26 and the spring fixing projection 34 of the covering member 3.

The valve member 2 abuts against and is able to slide relative to edges of the ribs 12, 35 provided on the inner surface of the case member 1 and the covering member 3. The ribs 12, 35 support and guide the valve member 2 to move in a steady position.

Figure 7:
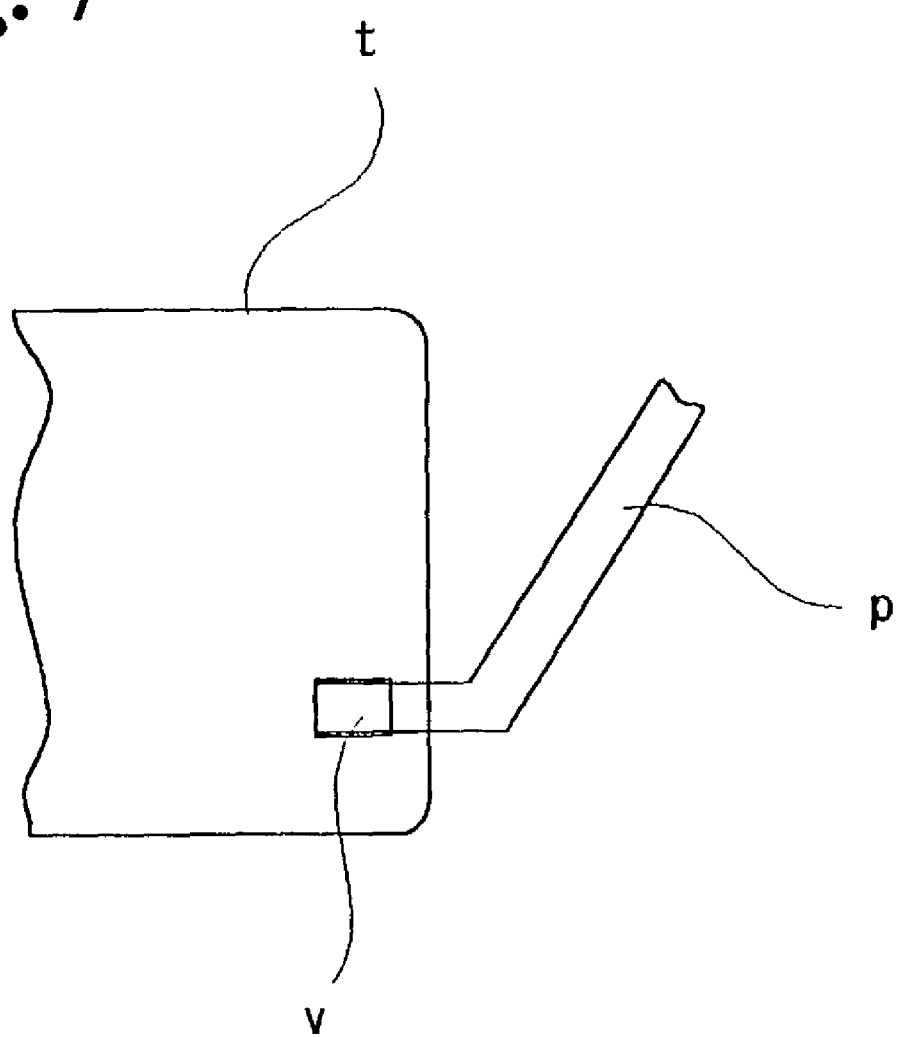
FIG. 7 is a schematic view showing a fuel tank of an automobile.

The backflow prevention valve is attached to the end of the supply pipe p for supplying the fuel to the fuel tank t in an automobile by connecting the liquid inflow pipe 5 in the same way of the valve v as shown in FIG. 7. As shown in FIG. 2(A), in a usual state, the sealing portion 65 of the sealing member 6 fixed to the valve member 2 contacts the peripheral edge of the inflow opening 11 of the case member 1 from inside due Lo the urging force of the coil spring 4.

Thus, the inflow opening 11 is closed, thereby preventing the fuel and other volatile vapor from leaking through the supply pipe p of the tank t.

Next, when the fuel is supplied, as shown in FIG. 2(B), the valve member 2 moves against the urging force of the coil spring 4 due to the fuel pressure infused into the tank t (refer to FIG. 7) through the liquid inflow pipe 5 from the supply pipe p (refer to FIG. 7), and the inflow opening 11 opens. The fuel flows into the case member 1 from the liquid inflow pipe 5, and the fuel is infused into the fuel tank t from the outlet 33 provided in the covering member 3 through between the valve member 2 and the inner surface of the case member 1. After the fueling is completed, the coil spring 4 moves the valve member 2 toward the inflow opening 11. Accordingly, the sealing portion 65 contacts the peripheral edge of the inflow opening 11 from inside, and the backflow prevention valve returns to the closed state again, as shown in FIG. 2(A).

According to the backflow prevention valve of the present embodiment, as described above, the ribs 12, 35 provided on the inner peripheral surface of the case member 1 and the covering member 3 support and guide the valve member 2 to open and close the inflow opening 11. Further, the inflow pipe 5 has the smooth inner surface without any unevenness. Therefore, even when the fuel is infused in a large amount at a high speed through the liquid inflow pipe 5 from the supply pipe p (refer to FIG. 7), the fuel flows smoothly inside the liquid inflow pipe 5 without generating turbulence. The valve member 2 opens and closes the inflow opening 11 smoothly during and after the fueling, thereby preventing unstable opening and closing movements of the valve member 2 due to the turbulence.

Figure 8A:
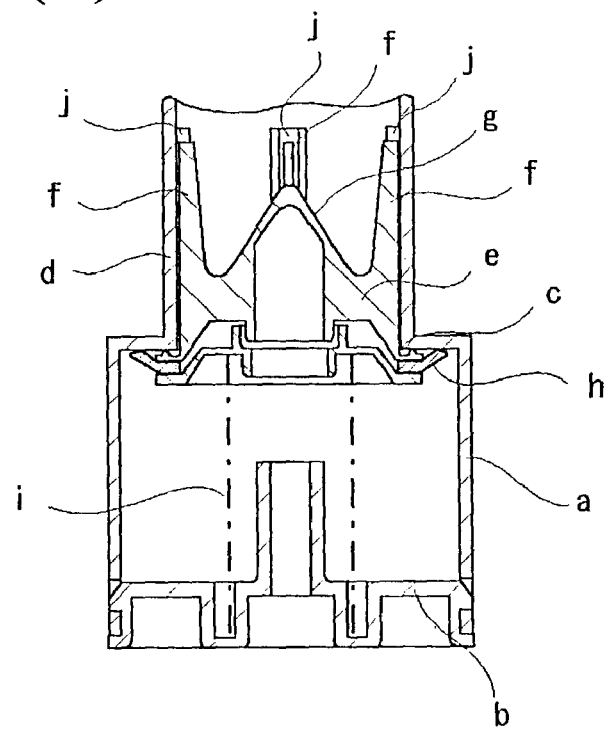
Figure 8B:
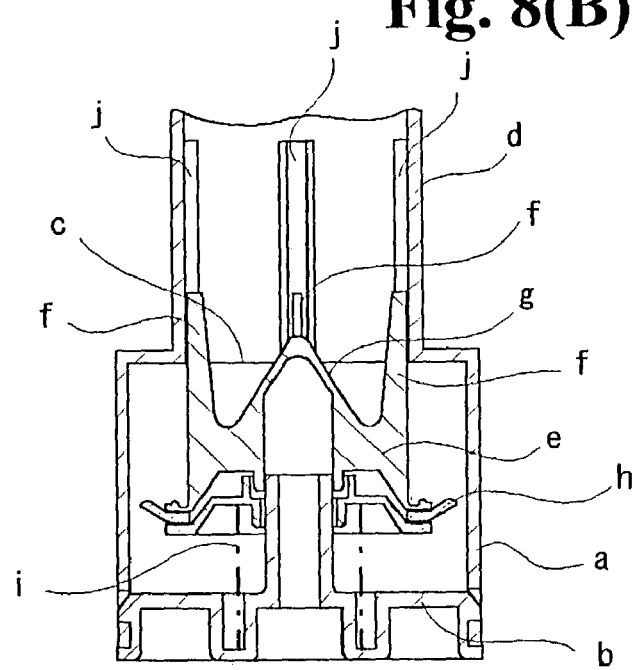

Therefore, the backflow prevention valve of the present invention usually closes the valve surely, and can reliably prevent the fuel backflow. Also, during and after the fueling, the valve member does not become unstable due to the turbulence of the fuel supplied as does the conventional valve shown in FIG. 8, thereby achieving the reliable and stable opening and closing movements.

FIGS. 3(A)–(B) and 4(A)–(B) show a backflow prevention valve according to the second embodiment of the present invention. In this valve, in place of the valve member 2 in the first embodiment, a valve member 7 having guiding slots 71 on a peripheral surface thereof is provided. Other components are used in the same way as the first embodiment.

As shown in FIGS. 3(A) and 3(B), the valve member 7 of the valve is formed of a cylindrical main member 72 with a top wall. Four guiding slots 71 are formed on the peripheral surface of the cylindrical main member 72 along the axial direction thereof at positions shifted by 90 degrees with each other. A ring-shaped sealing member 8 having a sealing portion 65 similar to the first embodiment is attached on an upper surface of the main member by a cap member 9.

The cap member 9 is formed in a cylindrical shape, and has an upper wall formed in a conical rectifying member 62. The cap member 9 is fixed to a hole formed at a center of the upper wall of the valve member 7. The sealing member 8 is fixed between the cap member 9 and the upper wall of the valve member 7.

Figure 4A:
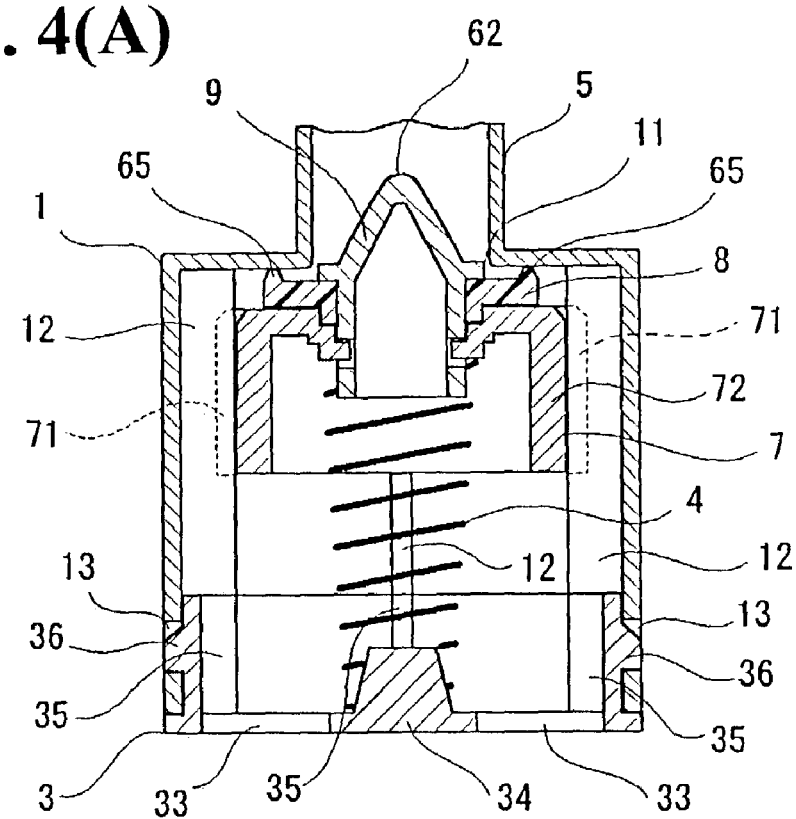
Figure 4B:
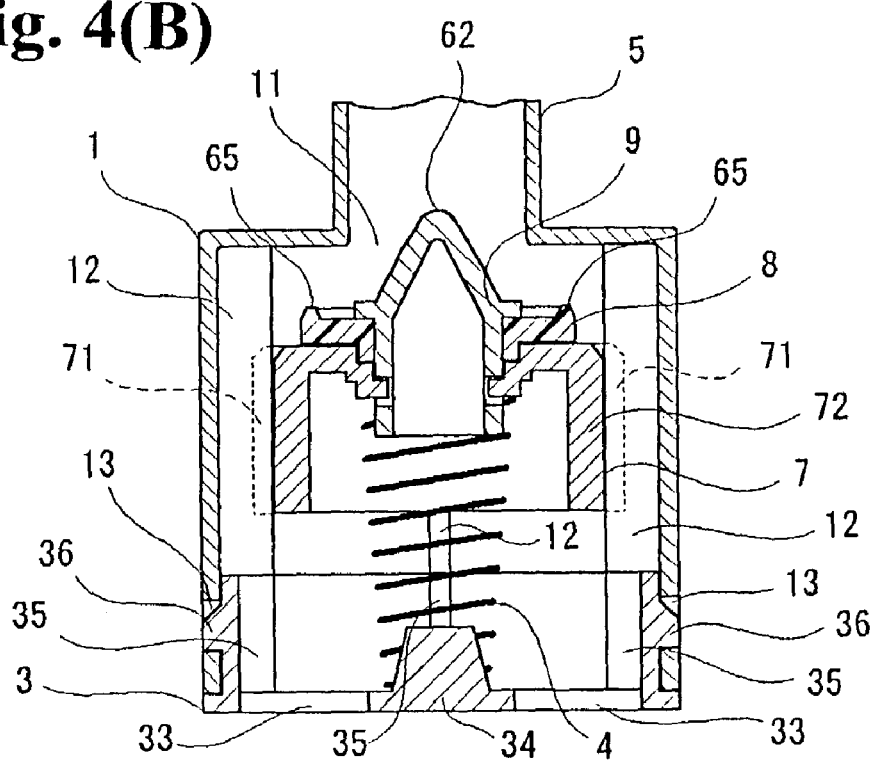

The valve member 7 is disposed inside the case member 1 and is urged by the coil spring 4, similar to the valve member 2 in the first embodiment. In this case, as shown in FIGS. 4(A) and 4(B), the valve member 7 is in a state that edges of the ribs 12, 35 provided on the case member 1 and the covering member 3 are fitted and capable of sliding inside the guiding slots 71 provided on the peripheral surface of the valve member 7, thereby supporting and guiding opening and closing movements of the valve member 7 stably.

As other configurations and functional effects are the same as the first embodiment, the same reference numerals denote the same parts, and the explanation is omitted.

FIGS. 5(A)–5(B) and 6(A)–6(B) show a backflow prevention valve according to the third embodiment of the present invention. In this valve, a valve member 10 including four guiding arms 20 is provided in place of the valve member 2 in the first embodiment. The guiding arms 20 are inserted in holes 15 formed in shoulder portions of a case member 1a. Moreover, the guiding arms 20 are inserted in four guiding slots 51 formed on the outer peripheral surface of the liquid inflow pipe 5. Other configurations are substantially the same as those of the first embodiment.

The case member 1a is provided with an inclined portion on a peripheral edge of the upper wall thereof. The guiding arms 20 of the valve member 10 are inserted into the holes 15 formed in the shoulder portion extending from the inclined portion to near the liquid inflow pipe 5 at positions shifted by 90 degrees with each other. Four outlet windows (outlets) 14 are formed on the peripheral wall of the case member 1a. Note that the rib 12 in the case member 1 of the first embodiment is not formed on the inner surface of the case member 1a.

Also, four pairs of projections are protruded on the outer peripheral surface of the liquid inflow pipe 5 connected to the inflow opening 11 of the case member 1a along the axial direction, so that four guiding slots 51 are formed between the projections at positions shifted by 90 degrees with each other, thereby communicating with the holes 15.

As shown in FIGS. 5(A) and 5(B), the valve member 10 is formed of a cylindrical main member 30 with an upper wall. Four guiding arms 20 are provided at a peripheral edge of an upper surface of the main member 30 at positions shifted by 90 degrees with each other. The cap member 9 and the sealing member 8 are fixed to the top surface of the main member 30 similar to the second embodiment.

Figure 6A:
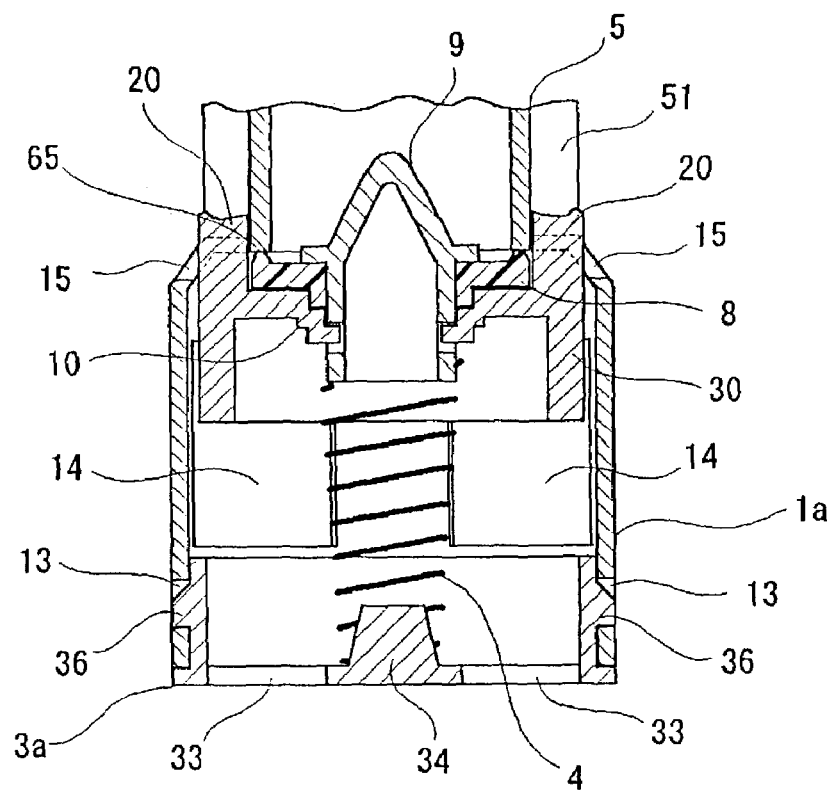
Figure 6B:
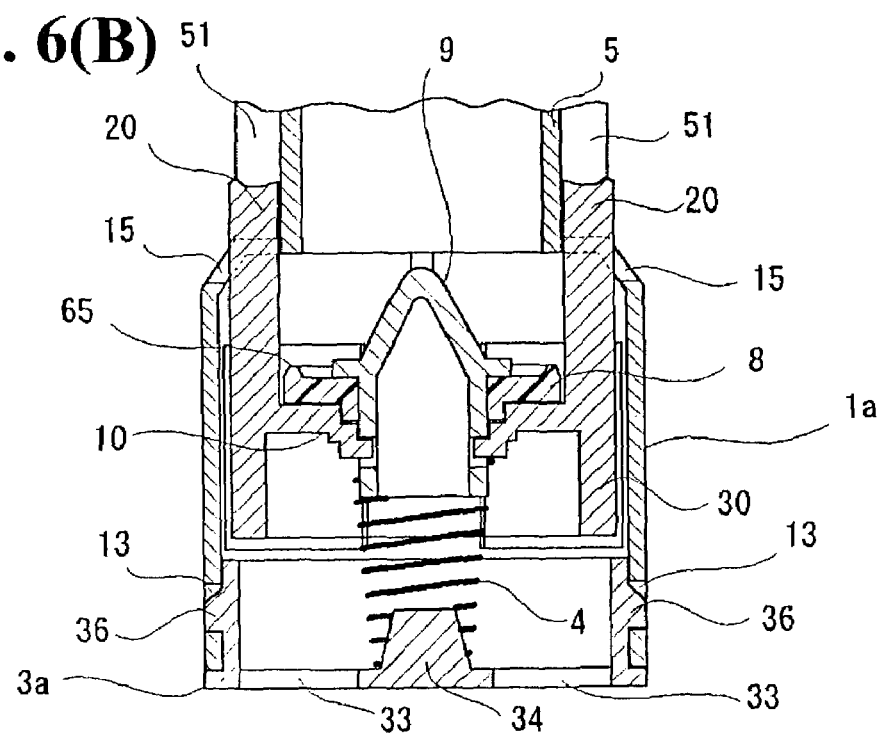

As shown in FIGS. 6(A) and 6(B), the valve member 10 is housed to be movable inside the case member 1a in a state that each guiding arm 20 is projected outside through each hole 15. Each four guiding arm 20 projecting from the case member 1a is inserted and capable of sliding in each guiding slot 51 formed on the outer peripheral surface of the liquid inflow pipe 5.

In the backflow prevention valve, as shown in FIGS. 6(A) and 6(B), the guiding arms 20 slide inside the guiding slots 51 to support and guide the valve member 10, so that the opening and closing movements of the valve member 10 can be carried out stably. Also, the inner peripheral surface of the case member 1a is formed without unevenness for guiding the valve member 10. Accordingly, the fuel flows into the tank more smoothly as compared to the valves in the first and second embodiments. In addition, the guiding arms 20 are projected upward from the valve member 10. Since the main member 30 of the valve member 10 does not need to provide a guiding function, the main member 30 of the valve member 10 can be made small, thereby reducing the sizes of the case member 1a and the valve.

In the backflow prevention valve of the third embodiment, as shown in FIG. 6(B), during the fueling, the fuel supplied into the case member 1a flows into the fuel tank through the outlets 33 provided on the covering member 3a as well as through outlet windows 14 provided on the peripheral wall of the case member 1a. The covering member 3a is the same as the covering member 3 in the first and second embodiments except that the covering member 3a does not include ribs on the inner peripheral surface. Since other configurations and functional effects are the same as those of the first embodiment and second embodiments, the same reference numerals are used for the same parts, and the explanation is omitted.

In the backflow prevention valve of the third embodiment, the guiding arms 20 are inserted and capable of sliding in the guiding slots 51 through the holes 15 to support and guide the valve member 10. Alternatively, the holes 15 are formed in approximately the same sectional shape and size as the guiding arms 20, and the guiding arms slide inside the holes 15, thereby supporting and guiding the opening and closing movements of the valve member. 10. In this case, the guiding slots 51 can be omitted. Further, it is possible to configure that the holes 15 and guiding slots 51 support and guide the opening and closing movements of the valve member 10 without omitting the guiding slots 51.

As described above, in the backflow prevention valves in the first, second, and third embodiments according to the present invention, the inner peripheral surface of the liquid inflow pipe 5 has a smooth surface without unevenness. As shown in the first and second embodiments, the supporting guiding device is provided between the inner peripheral surface of the case member 1 and the outer peripheral surface of the valve members 2, 7 for supporting and guiding the valve members 2, 7 to be movable for opening and closing the valves. As shown in the third embodiment, the guiding arms 20 provided in the valve member 10 are inserted into the guiding slots 51 provided on the outer peripheral surface of the liquid inflow pipe 5 for supporting and guiding the valve member 10 to be movable for opening and closing the valve.

With these configurations, even when the fuel is infused in a large amount at a high speed through the liquid inflow pipe 5 from the supply pipe, the fuel flows smoothly inside the liquid inflow pipe 5 without generating the turbulence. The opening and closing movements of the valve members 2, 7, 10 can be carried out smoothly during and after the fueling without being unstable due to the turbulence.

Therefore, the backflow prevention valve usually closes the valve surely and can prevent the fuel backflow reliably. Also, during and after the fueling, the opening and closing movements can be carried out reliably and stably.

Further, the present invention is not limited lo the above-mentioned embodiments, and the shape and combination of each configuration members can be changed diversely within the limits of the present invention.

As described above, according to the backflow prevention valve of the present invention, even when the fuel is infused in a large amount at a high speed through the liquid inflow pipe, the fuel flows smoothly without generating the turbulence inside the liquid inflow pipe, which has the smooth inner surface without unevenness. The opening and closing movements of the valve members during and after the fueling can be carried out smoothly, and there are no unstable opening and closing movements of the valve members due to the turbulence, so that the highly reliable opening and closing movements can be achieved.

While the invention has been explained with reference to the specific embodiments of the invention, the explanation is illustrative and the invention is limited only by the appended claims.

What is claimed is:

1. A backflow prevention valve attached to a fuel supply pipe for preventing a backflow of fuel, comprising:
    a cylindrical case member having a peripheral wall, an inflow opening formed at one end, and an outlet formed in at least one of the other end and the peripheral wall,
    a plurality of ribs integrally formed with the case member and projecting inwardly from an inner surface of the peripheral wall to extend along an axial direction of the case member,
    a valve member formed of a cylindrical main member disposed in the case member to be movable in the axial direction thereof so that the ribs contact an outer peripheral surface of the valve member to support and guide the same, said valve member having a sealing portion at an upper surface thereof for contacting a peripheral edge of the inflow opening to close the same,
    an urging device disposed in the case member for urging the valve member toward the inflow opening,
    a liquid inflow pipe extending outwardly from the case member around the inflow opening and having a smooth inner surface to allow the fuel to smoothly flow through the backflow prevention valve, and
    a covering member attached to a bottom of the case member, said urging device being disposed on the covering member.

2. A backflow prevention valve according to claim 1, wherein said valve member further includes a plurality of guiding slots formed on the outer peripheral surface along the axial direction of the case member for receiving the ribs to slide inside the guiding slots.

3. A backflow prevention valve according to claim 1, wherein said sealing portion includes a circular main member having a size less than that of an upper portion of the cylindrical main member, and a circular projection wall protruded on an upper surface of the main member to constitute a sealing portion.

4. A backflow prevention valve according to claim 3, wherein said circular main member further includes a conical member projecting outwardly from a center of the circular main member.

5. A backflow prevention valve according to claim 3, wherein said cylindrical main member includes a partition wall, said sealing portion being attached above the partition, and notched window portions at a peripheral wall below the partition wall.

* * * * *